United States Patent
Anderton et al.

(10) Patent No.: US 11,013,214 B2
(45) Date of Patent: May 25, 2021

(54) METHODS AND SYSTEMS FOR MONITORING AND FEEDING A PET

(71) Applicant: WAGZ, Inc., Port, NH (US)

(72) Inventors: Terry Anderton, Hampton Falls, NH (US); Samuel Stoddard, Somersworth, NH (US)

(73) Assignee: WAGZ, Inc., Portsmouth, NH (US)

(*) Notice: Subject to any disclaimer, the term of this patent is extended or adjusted under 35 U.S.C. 154(b) by 399 days.

(21) Appl. No.: 16/047,348

(22) Filed: Jul. 27, 2018

(65) Prior Publication Data

US 2019/0029222 A1 Jan. 31, 2019

Related U.S. Application Data

(60) Provisional application No. 62/677,326, filed on May 29, 2018, provisional application No. 62/537,812, filed on Jul. 27, 2017.

(51) Int. Cl.
*A01K 5/02* (2006.01)
*A01K 11/00* (2006.01)
*G06F 16/2457* (2019.01)
*A01K 29/00* (2006.01)

(52) U.S. Cl.
CPC ............ *A01K 5/0275* (2013.01); *A01K 5/025* (2013.01); *A01K 5/0225* (2013.01); *A01K 5/0233* (2013.01); *A01K 11/006* (2013.01); *A01K 29/005* (2013.01); *G06F 16/2457* (2019.01)

(58) Field of Classification Search
CPC .. A01K 5/0275; A01K 5/0225; A01K 5/0233; A01K 5/025
See application file for complete search history.

(56) References Cited

U.S. PATENT DOCUMENTS

| | | | | |
|---|---|---|---|---|
| 5,230,300 | A * | 7/1993 | Mezhinsky | A01K 5/0291 119/51.11 |
| 2001/0027751 | A1* | 10/2001 | van den Berg | G01G 21/23 119/51.02 |
| 2003/0084853 | A1* | 5/2003 | Voogd | A01K 5/0283 119/51.02 |
| 2007/0000445 | A1* | 1/2007 | Blais | A01K 5/0291 119/56.1 |

(Continued)

*Primary Examiner* — Monica L Barlow
(74) *Attorney, Agent, or Firm* — Ascentage Patent Law, LLC; Travis Lee Johnson

(57) ABSTRACT

A pet monitoring and feeding system including having a dispenser, the dispenser having: a main body; a bowl provided about a base portion of the main body; a cavity configured to selectively receive the bowl; one or more dispenser sensors being configured to provide proximity data regarding environmental or pet parameters about the dispenser; and one or more food receptacles. The system further including a wireless transponder that could worn as a pendant or incorporated into a collar having one or more collar sensors that is configured to interact with the one or more sensors of the dispenser and processing circuitry. The processing circuitry being configured to receive sensor data from both the dispenser sensors and the collar sensors, the processing circuitry being configured to determine an appropriate portion size of a particular food being contained in the one or more food receptacles and activate the dispenser so as to dispense a selectively measured portion of the particular food.

12 Claims, 14 Drawing Sheets

(56) References Cited

U.S. PATENT DOCUMENTS

| | | | |
|---|---|---|---|
| 2011/0226185 A1* | 9/2011 | Stadler | A01K 11/006 119/51.02 |
| 2013/0233248 A1* | 9/2013 | Veness | A01K 5/0114 119/56.1 |
| 2014/0000522 A1* | 1/2014 | Christensen | A01K 11/006 119/51.02 |

* cited by examiner

METHODS AND SYSTEMS FOR MONITORING AND FEEDING A PET

RELATED APPLICATIONS

This application claims priority to U.S. Provisional Patent Application No. 62/537,812 which was filed on Jul. 27, 2017, and 62/677,326 which was filed on May 29, 2018, both of which are hereby incorporated by reference in their entirety.

FIELD OF THE INVENTION

The present invention relates generally to food dispenser systems for animals and particularly domestic pets.

BACKGROUND OF THE INVENTION

As of yet pet food dispensers have been limited with regard to the various functions they can provide. In particular, pet food dispensers have pre-defined quantities that they dispense, and must either be activated through training, i.e. having the pet press on a lever or actuator, or the pet owner must somehow set the actuation either manually or through the use of a timer. Present food dispensers also have limitations in multi-pet households wherein a dominant animal can force other animals away when food is dispensed and as such it can be difficult to control portion sizes between various pets. In addition, pets which live sedentary lifestyles can require less food than pets which live active lifestyles.

SUMMARY OF THE INVENTION

Contemplated herein is a system which utilizes data derived from a plurality of sensors so as to determine and dispense a particular portion to a particular pet. The system can include a collar, harness, or other means about the pet which can have these sensors embedded therein. The system can also include a food dispenser which can also include additional sensor and communication means provided therein which can recognize a particular pet, transmit data, and receive or determine a particular portion size appropriate for the pet and then dispense the appropriate portion to the particular pet.

As discussed briefly above, an owner can create a pet profile, which the system can store, wherein the user can provide data input regarding the breed, age, gender, health conditions of the animal. The system can also be configured to receive or track various alternative information, such as activity level or environmental factors, which can then be associated with a user or pet profile, the alternative information being specific to the animal or pet wearing the collar.

Based on the profile information as well as the alternative information the system can utilize processing circuitry to determine the correct quantity and type of food which should be provided to the pet.

In some instances, as the needs of the pet change, the system can determine and make suggestions to the owner as to correct food for charging the dispenser.

In some instances the pet owner can create an owner profile which would allow them to receive messages and suggestions through notifications provided on a mobile device or through email.

Utilizing the user profile, the owner can then provide payment information and set up automatic ordering and delivery of suggested or optimized food types or mixtures based on the sensed data and profile information.

Additionally, the food dispenser can also be provided with a means which would only present food to the appropriate animal, particularly in multi-animal households and wherein the dispenser would be triggered by a proximity sensor in the collar, but can be deactivated when multiple animals are sensed, i.e. a dominant animal is too close and waiting to steal a submissive animal's food. As such, if another animal nudged the correct animal out of the way the food could be retracted, covered, or otherwise made unavailable until only the correct animal is present.

In some additional embodiments, the dispenser, or the collar, can be utilized to provide positive reinforcement sounds, such as a customized dinner bell, which is custom to a particular animal, or in some embodiments could be emitted from the collar of a particular animal it is that associated animal's turn to eat.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
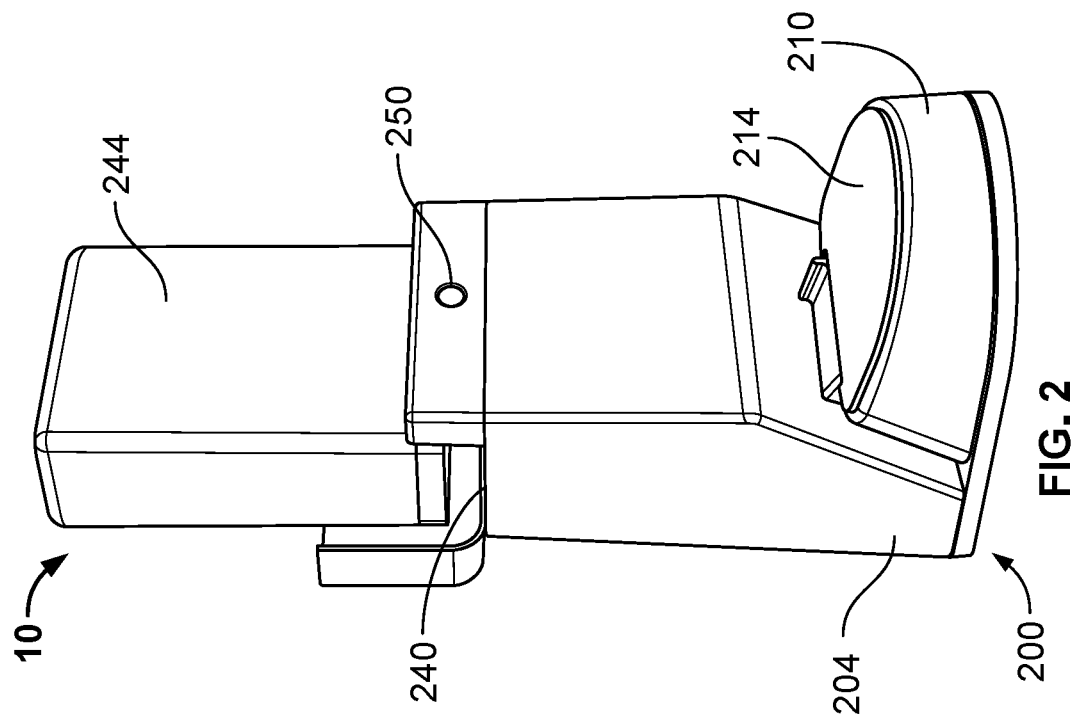
FIG. 2 illustrates a perspective view of the dispenser of FIG. 1 in an open loading configuration being illustrative of various embodiments of the present invention.
Figure 1:
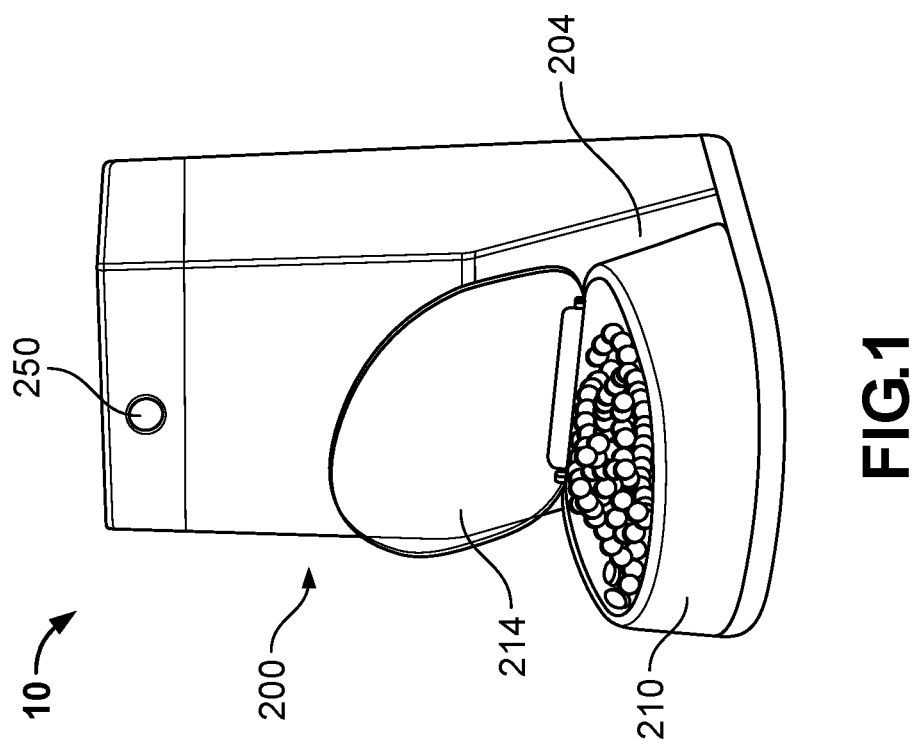
FIG. 1 illustrates a perspective view of a dispenser illustrative of various embodiments of the present invention in a dispensed feeding configuration.
Figure 3:
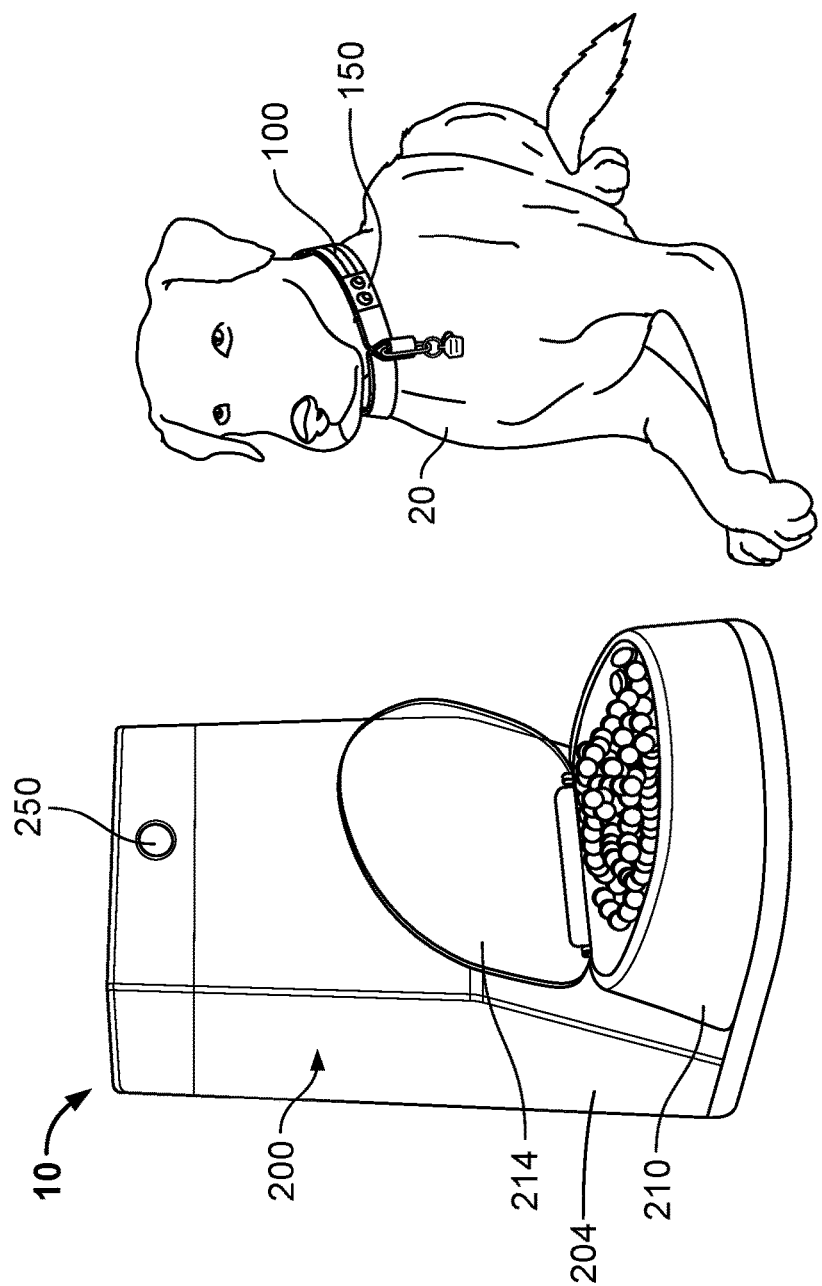
FIG. 3 illustrates a perspective view of the dispenser of FIG. 1 and an associated pet having a sensor collar, in an open or feeding configuration being illustrative of various embodiments of the present invention.

Contemplated herein is a pet feeding system 10 which utilizes data derived from a plurality of sensors so as to determine and dispense a particular portion of feed to a particular pet. The system 10 can include a food dispenser 200 which can also include additional sensor and communication means provided therein which can recognize a particular pet, transmit data, and receive or determine a particular portion size appropriate for the pet and then dispense the appropriate portion to the particular pet.

In some embodiments, the system 10 can be configured to pair with or detect sensors embedded within a collar 100, harness, pendant or other means about the pet which can have these sensors embedded therein. However, as technology allows, some other methods of pet identification can be achieved utilizing sensors provided solely on the food dispenser 200. One example of which may include facial recognition. However, other means of pet detection are contemplated herein, such as detection by the feeder 200 of already embedded RFID identification tags, similar to those which can be injected or otherwise placed subcutaneously and later utilized by veterinarians or humane societies in identifying lost animals.

As discussed briefly above, an owner can create a pet profile for one or more pets, wherein the system can store user input data regarding the breed, age, gender, health conditions, etc., of the animal. The system 10 can also be configured to receive or track various alternative information, such as activity level or environmental factors, which can then be associated with a user or pet profile, the alternative information being specific to the animal or pet wearing the collar.

It will be appreciated that the system can include computer instructions located on a non-transitory computer-readable medium which can be stored locally, or remotely at a network location. Processing circuitry can then be utilized either locally, remotely, or both to store the pet or user profiles on a non-transitory computer-readable medium for later access and analyzation. Additional information regarding breeds can be accessed from pre-existing databases, as well as from a system specific database which can compare similar pets and animals of similar or identical breeds between system users.

Based on the profile information, as well as the alternative information, the system can utilize processing circuitry to determine the correct quantity and type of food which should be provided to each pet 20.

In some instances, as the needs of the pet change, the system can determine and make suggestions to the owner regarding the correct or most ideal food with which to charge the dispenser, feeding intervals, maximum. In some embodiments, particularly in multi-pet homes, the dispenser can include a plurality of receptacles 240 for receiving and dispensing a plurality of different food types optimized for each pet in the household. Alternatively, various receptacles can be utilized to provide a mix of different foods to a particular pet.

In some embodiments, and as shown, the food dispenser 200, can have a bowl 210 near base portion 204, which can receive the appropriate portion of food 218 for the particular pet.

Figure 4:
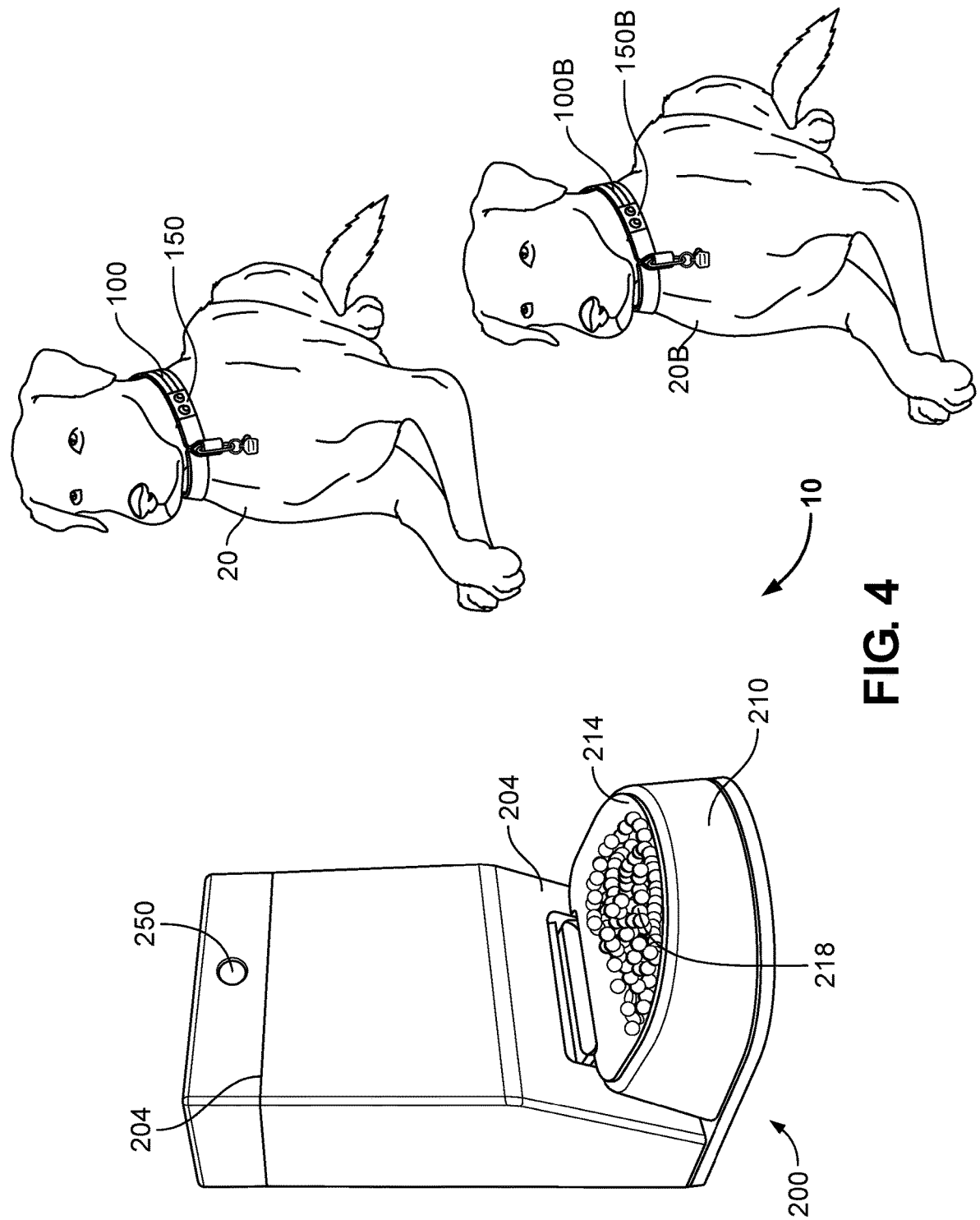
FIG. 4 illustrates a perspective view of the dispenser of FIG. 1 and various associated pets having a sensor collar, in a closed configuration being illustrative of various embodiments of the present invention.
Figure 14:
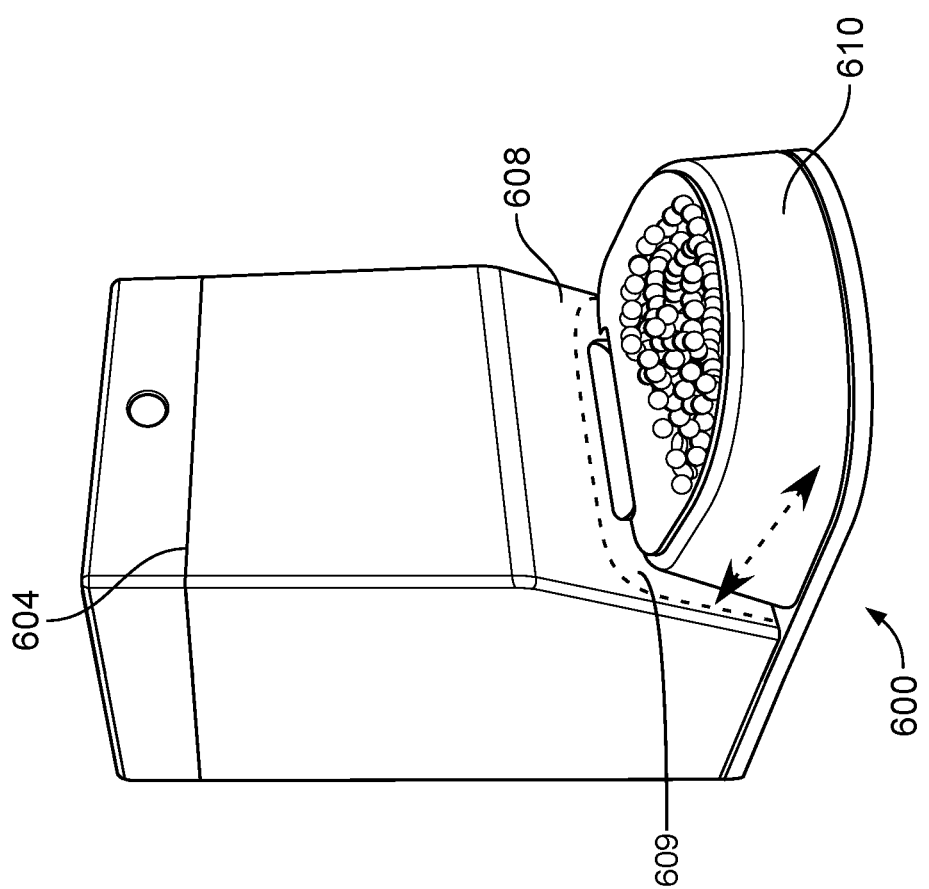
FIG. 14 illustrates a perspective view of an alternative dispenser having a retractable or extendable bowl being illustrative of various potential embodiments of the present invention.

In some embodiments, and as illustrated in FIGS. 4 and 14, wherein an authorized pet 20, which may be wearing a collar 100 with sensors or wireless transponders 150 embedded therein is present at the feeder 200, the feeder can provide unrestricted access to the food. However, when an unauthorized pet 20B having a collar 100B and sensors 150B, which the feeder determines as unauthorized, i.e. because the food dispensed is only for authorized pet 20, the feeder can then shut the shield or cover 214, or 314 so as to restrict access to the food 218 until the unauthorized pet leaves the vicinity of the feeder.

Alternatively, and as illustrated In FIG. 14, the bowl 610 can be retracted back into a cavity 608 being provided in the main body portion 604 for filling. Similarly, the cavity 608 can be utilized such that the bowl 610 can be removed from view or access by the pets, such as when another animal is present and attempting to steal the intended pet's food.

In yet additional embodiments a corrective signal can be provided to the unauthorized pet, such as a vibration, shock, verbal reprimand played through a speaker, etc., so as to deter and train the unauthorized pet from interfering with the intended pet's food.

In yet additional embodiments, while the food can be provided at specific timed feeding intervals, the food can also be retracted or covered after a certain amount of time, so as to train the pet to eat within a certain timeframe. In some such instances the food can be weighed to determine dispensed portions, and ultimately weighed again, so as to determine how much food was consumed so as to track pet consumption and increase historical data for analysis within the pet's particular pet profile, as well as share data for additional analysis regarding additional factors such as age or breed.

In yet additional embodiments the bowl 210 can be removable for easy cleaning and replacement near the base portion 204, 304.

In addition, the dispenser 200 can be provided with one or more sensors 250, which can be configured to detect various conditions about the feeder itself, the food loaded therein, as well as conditions about the environment, such as pets in the vicinity or other environmental conditions. Such sensors can include optical sensors, which can be accessed over a mobile network to allow for direct control of dispensing by a user or operator. The sensors can also include wireless transceivers. In yet additional embodiments the pet can be provided a collar 100 having RFID, or another near field communication, identification, or communication means, provided therein which can then identify an associated pet.

Additional sensors can include pressure or weight sensors to determine how much of the dispensed food the animal consumed along with a time-frame to show how quickly the animal consumed the food for a given day or a given type of food. This information can similarly be transmitted via a networked and processed remotely on a server or on a user-device, such as a smartphone, to further determine appropriate quantities, health, delivery orders and so forth. This information can be transmitted to the pet's owner, the pet's veterinarian, and the company or delivery service providing the food. The pet feeder system can also include environmental sensors determining temperature, humidity and other environmental conditions.

On a larger scale, the delivery or pet food provided can utilize information provided by a plurality of pet's feeding habits to determine the amount of a given pet food it should produce during a given time of year. These trends can be monitored and automated to prevent waste.

It will then be appreciated that the collar 100 can be provided with one or more sensors 150 which can include GPS trackers, accelerometers, pedometers, i.e. step counters, Wi-Fi or Bluetooth connectivity, as well as any number of other sensors which can then provide environmental or individual parameters about the pet or the pet's surroundings.

In yet additional embodiments, one or more sensors or wireless transponders which can be utilized for pet identification, tracking, or other functions, can be provided in a separate pendant or tag which can be affixed or otherwise coupled to a normal pre-existing collar.

It will be appreciated that the system 10 can also be configured to pair with or otherwise register detectable sensors or transponders provided about the pet. In which case any number of collars, pendants, tags, transponders, etc. can be provided utilizing any number of means about the pet, and then the system 10 and feeder 200 can be configured to dispense according to the saved profile information and registered identification means.

In some instances, a step counter can be utilized to determine pet activity levels, or GPS can determine how far a pet has traveled in a given day so as to be factored into a food portion size or food type. In some embodiments the collar can include a GPS configured to determine distance traveled and activity level derived therefrom for factoring into food portion size or food type. Also, GPS can provide locational information which then can be utilized to determine environmental factors, such as weather, temperature, or other information about the pet's location from an independent network accessible database.

It will be appreciated that the dispenser can also be provided with some network connection means, such as wi-fi or Bluetooth which can then allow the dispenser to be accessed via an internet or other network connection. Location information can be input by the user, or determined using GPS or internet provider address, and environmental data can be determined or accessed based on the location.

In yet additional embodiments temperature other real time environmental sensors can be provided on the collar or the dispenser so as to allow for real-time determinations of the environmental conditions with regard to the immediate surroundings of a given animal. As such, it will be understood that a pet might be located in a cold external environment, but actually resides indoors in a heated or otherwise controlled environment, and as such the portion size or type can be adjusted accordingly.

In some additional embodiments, the dispenser, or the collar can include an audio transmitter, wherein the audio transmitter can be utilized to provide positive reinforcement sounds, such as a customized dinner bell, which is custom to a particular animal, or in some embodiments could be emitted from the collar of a particular animal when it is that animal's turn to eat. In yet additional embodiments the audio transmitter can also be utilized to provide a positive reinforcement sound to provide positive reinforcement to the animal upon meal completion or complete consumption.

In some additional embodiments, each food receptacle 240 can be configured to receive a food cartridge 244 having food specified food provided therein, wherein each receptacle can be provided with an auger, not shown, provided therein for transferring the food from the cartridge 244 into the bowl 210. The auger can be motorized and be configured to dispense a measured portion of food or a certain amount of a particular food into the bowl 210.

Figure 5:
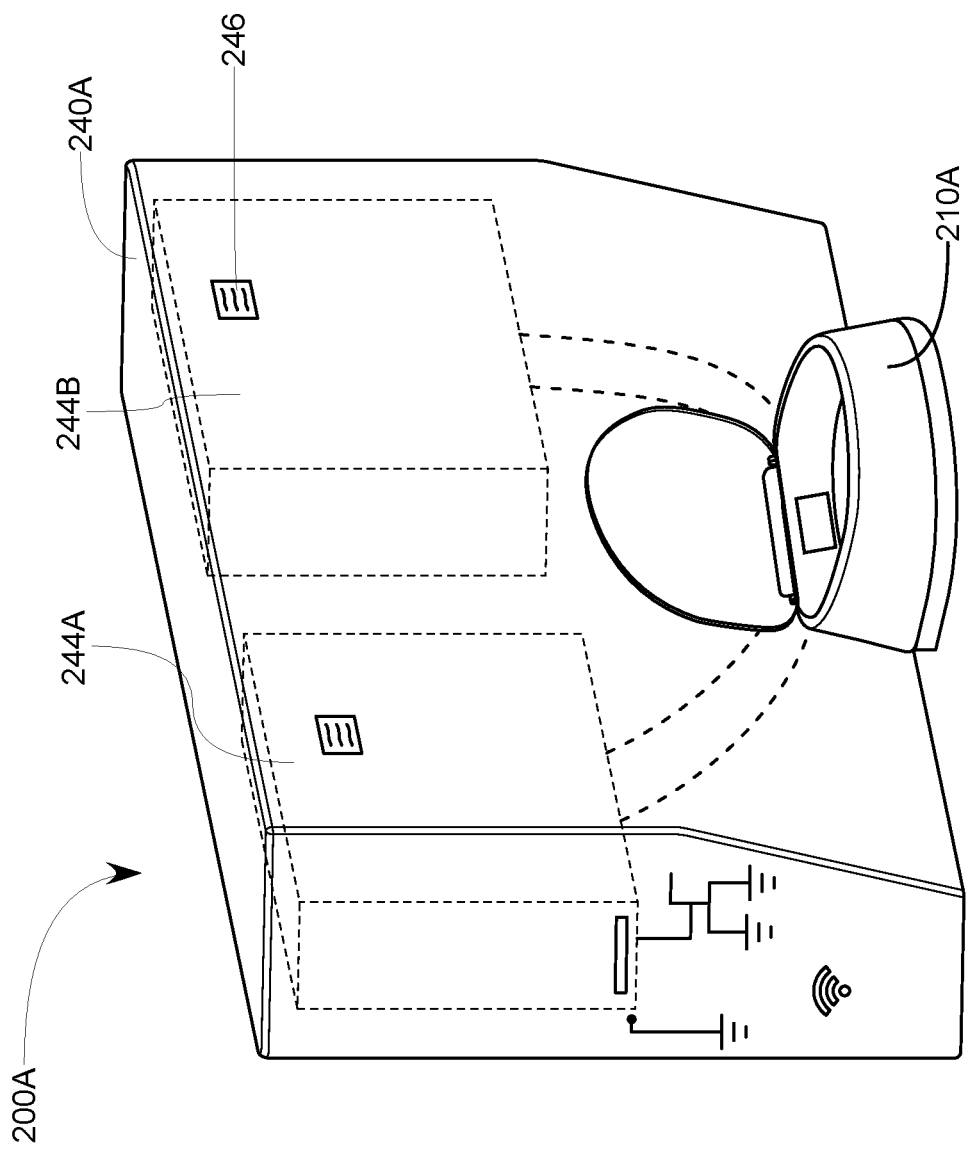
FIG. 5 illustrates a perspective view of an alternative embodiment of a dispenser having multiple food cartridges.
Figure 6:
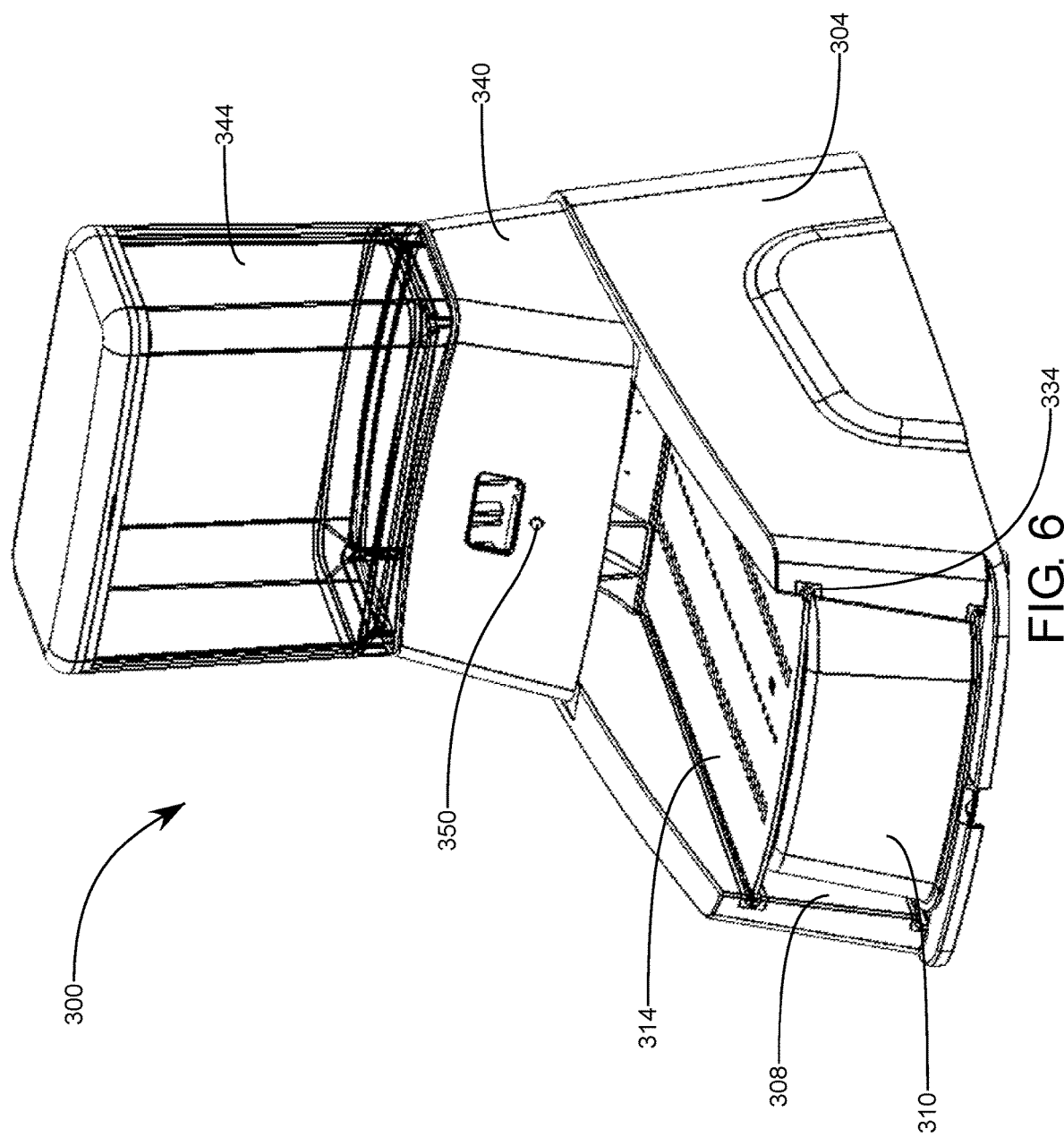
FIG. 6 illustrates an isometric view of yet another alternative embodiment of a food dispenser illustrative of various aspects of the present invention.
Figure 7:
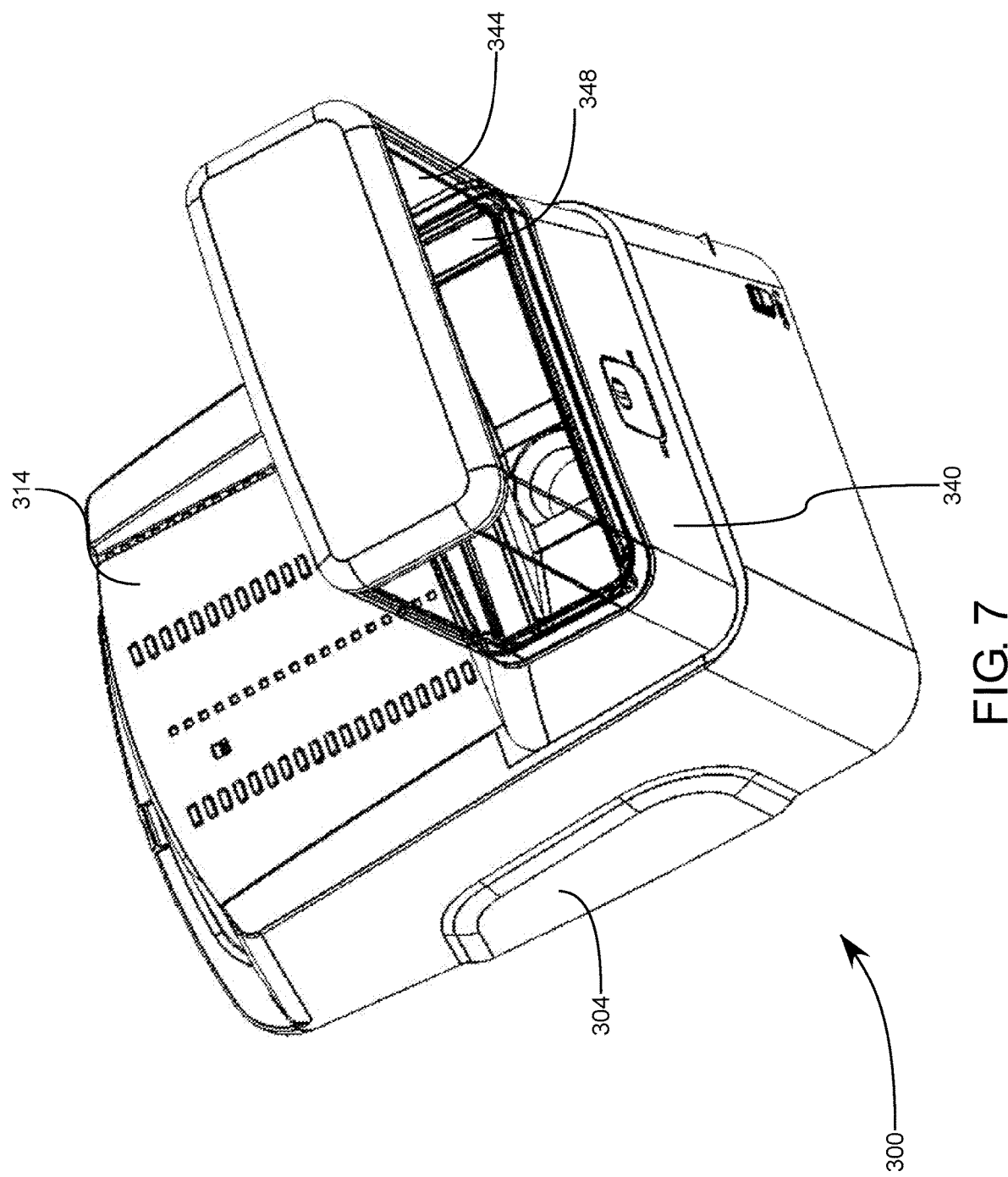
FIG. 7 illustrates a top perspective view the food dispenser of FIG. 6.
Figure 8:
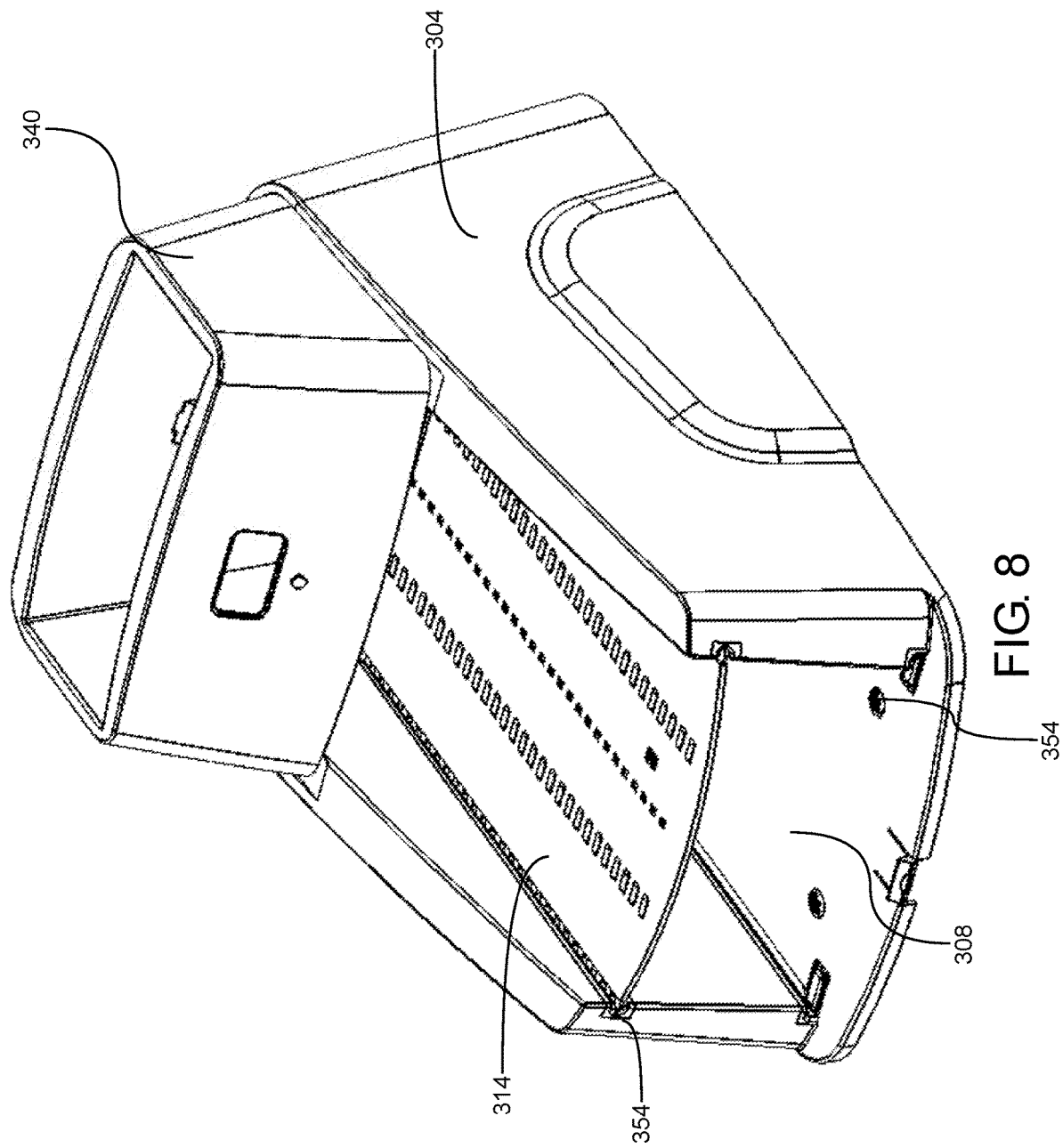
FIG. 8 illustrates an isometric view of a base portion of the food dispenser of FIG. 6.
Figure 9:
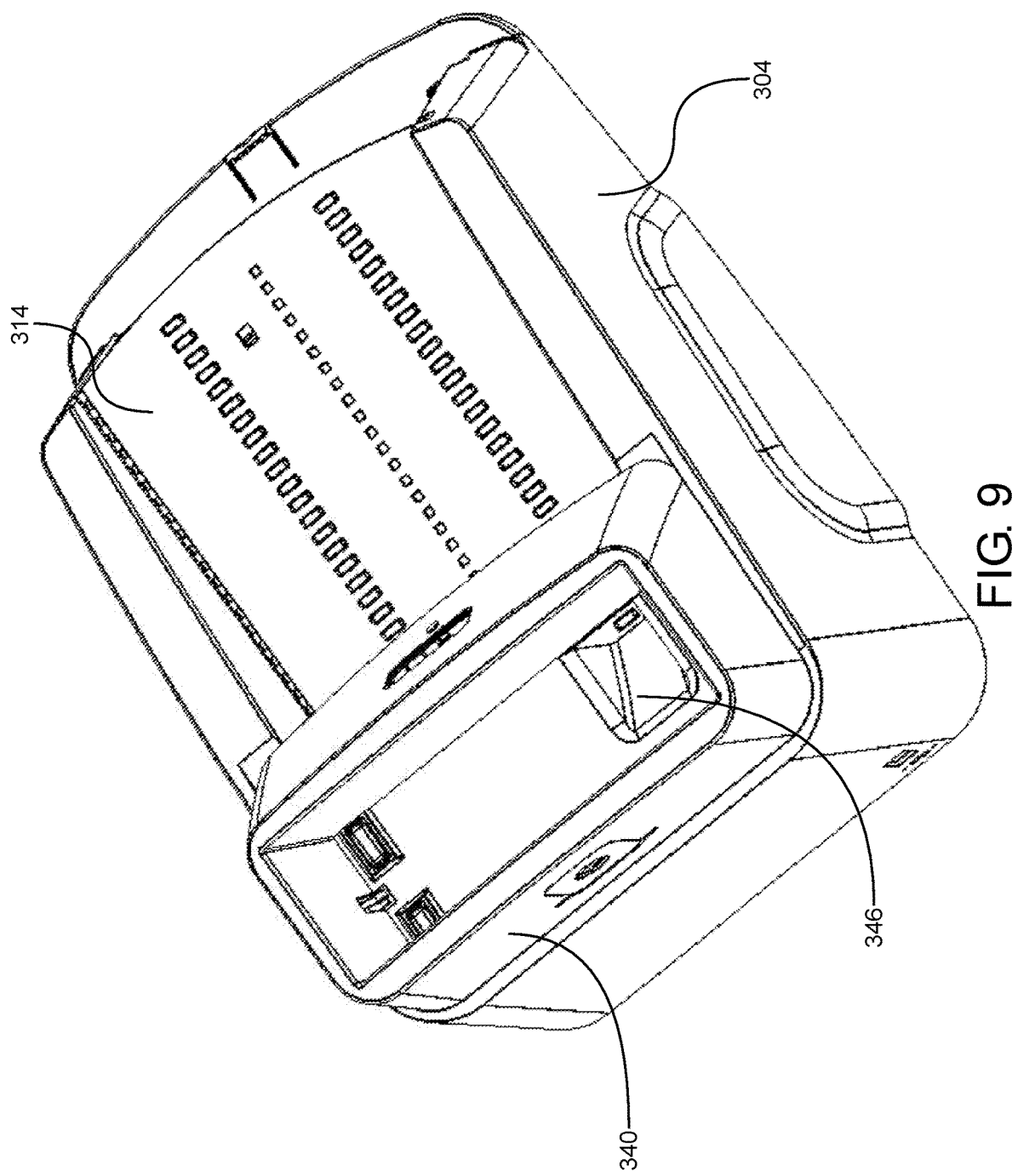
FIG. 9 illustrates a top perspective view of the base portion of the food dispenser of FIG. 6.
Figure 10:
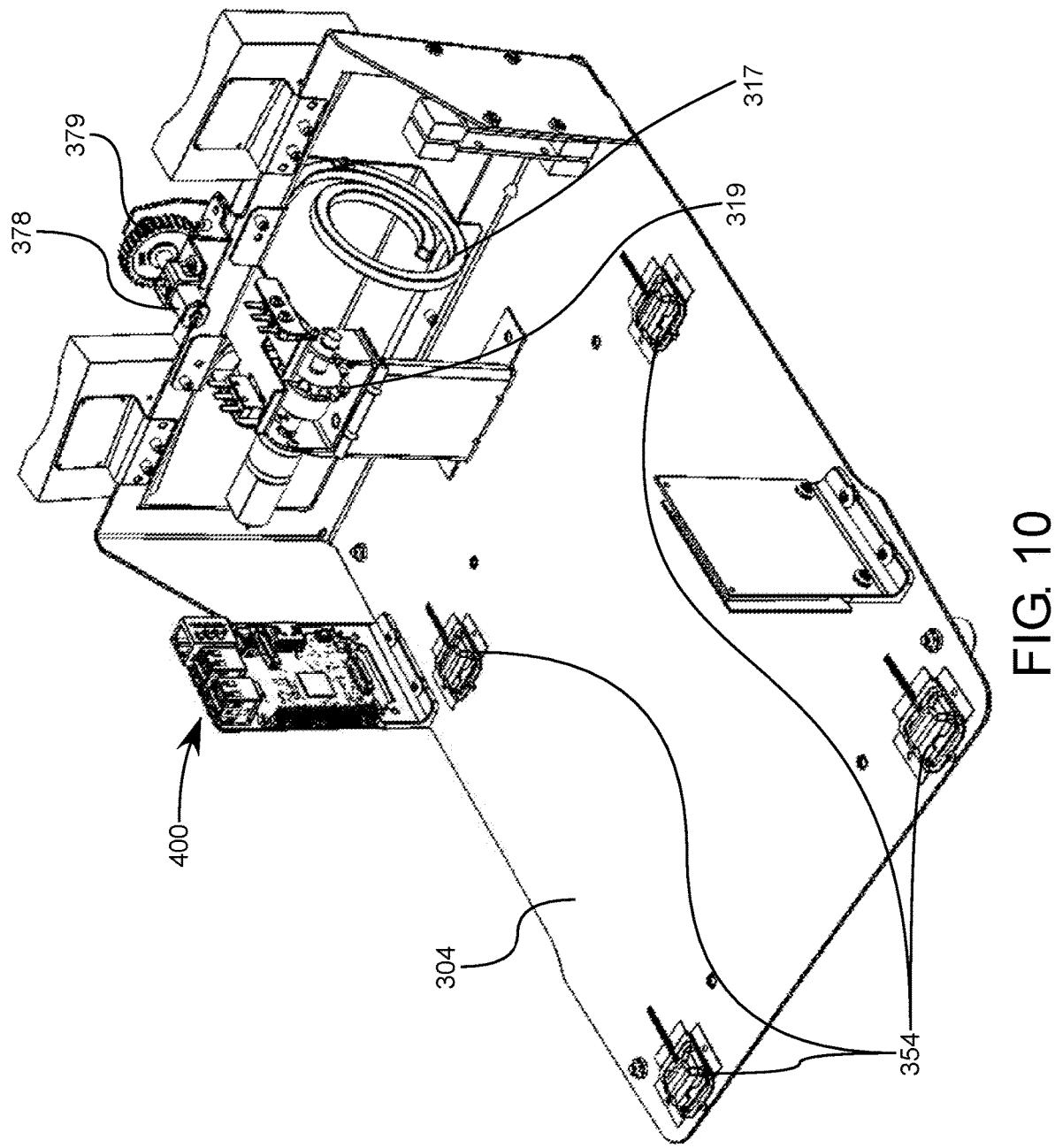
FIG. 10 illustrates an isometric interior view of the base portion of the food dispenser of FIG. 6.
Figure 11:
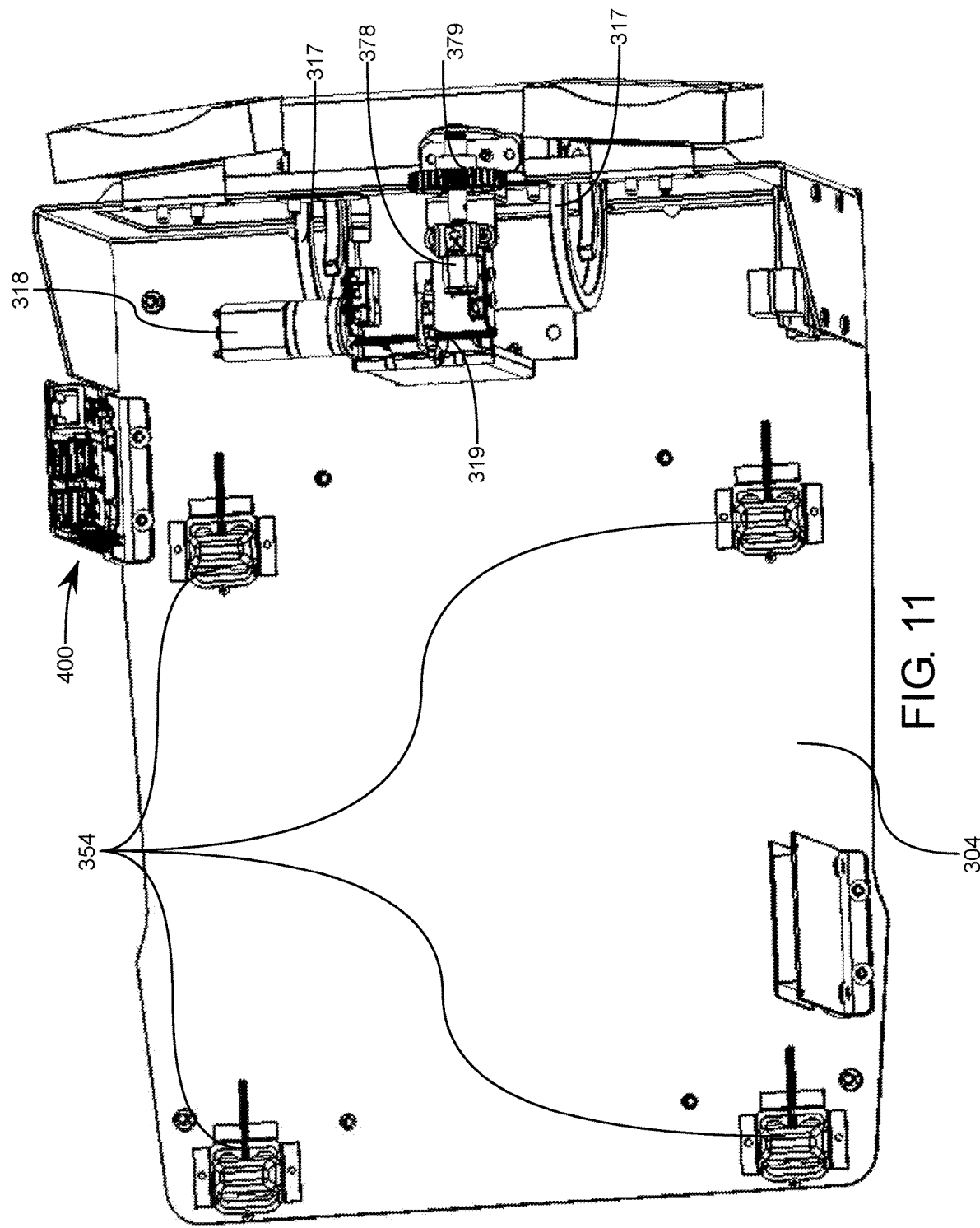
FIG. 11 illustrates a top perspective interior view of the base portion of the food dispenser of FIG. 6.

In some embodiments, and as shown in FIG. 5, an alternative feeder or dispenser 200A is contemplated herein which can accepts multiple or varying food cartridges 244A-B therein which can be provided into various compartments within the receptacle 240A, with individual augers for each cartridge wherein the feeder or dispenser 200 can be configured to dispense one food or the other, or even a mixture of the vary foods into bowl 210A.

In various embodiments, the receptacle can include food charges or cartridges which can include an identification means 246 thereon, i.e. RFID tags, bar-codes, etc., along with an associated reading or recognition means provided about the feeder. In this manner, the feeder can determine the type of food contained therein and the system can then access nutritional data regarding that particular food so as to accurately determine appropriate portions sizes.

Additionally, the feeder can include weight or other sensors that can determine when the one or more food receptacles are full vs. empty, which information can then be utilized to provide an alert to the user regarding when to refill the receptacle.

In some embodiments, the food packaging cartridge can be provided with additional sensors, electronic components, etc., which interact with connectors on an interior of the receptacle which can allow the feeder to determine various characteristics about the food, such as type, weight, fill level, etc.

It will be understood, and as illustrated by FIG. 5 that various foods can be loaded into a single dispenser, such that different foods can be dispensed to various pets. Alternatively, a mix of one or more foods having a particular composition can be dispensed to a particular pet, while a different pet can receive a differing composition of the same foods.

FIGS. 6-12 illustrate yet another embodiment of a smart pet food dispenser 300 having various alternative methods of implementing the various features and functions as discussed above, as well as various new features and functions. Similar to the above embodiments the smart pet food dispenser 300 can include a receptacle 340 for receiving a desired food container or cartridge 344 with a corresponding a cavity 308 for receiving a bowl or container 310 for ultimately providing the food to a pet.

Figure 12:
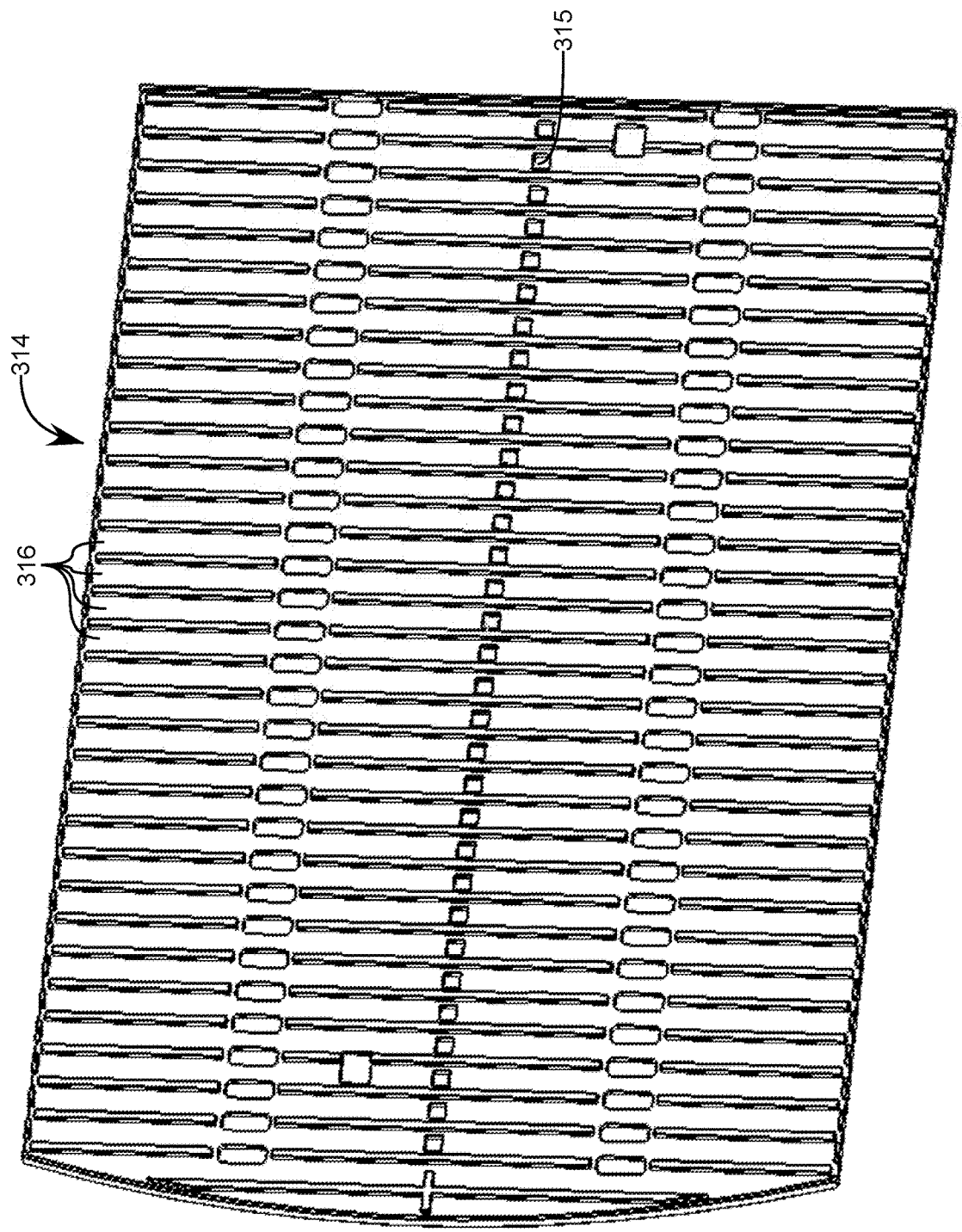
FIG. 12 illustrates a top perspective view of a retractable cover for use with the food dispenser of FIG. 6.

In this embodiment the smart pet food dispenser 300 can include a retractable cover 314 instead of the hinged or swinging cover illustrated and discussed above. The retractable cover 314 can include a plurality of hinged sections 316 which can roll up similar to a tambour door, as illustrated in FIG. 12. Alternatively, the retractable cover 314 can be formed of a resilient or malleable sheet material which can be rolled up but still be strong or resilient enough so as to prevent undesired access to the bowl 310 contained in the cavity 308 by a determined pet. The retractable cover can then be coiled and retained within the base on a coil retainer 317, which can have a spiraled shaped so as to maintain proper orientation and alignment during the retraction and extension operations.

The edges of the retractable cover 314 can seat within channels 334 provided in an edge portion of the base 304. It will be appreciated that the retractable cover 314 travels along the channels 334 during retraction and extension operations. The retraction and extension operations can be effectuated by an actuator 318 having a spoked cog 319. The spoked cog 319 can have teeth or spokes which can be configured to engage with corresponding recesses 315 provided in the surface of the retractable cover 314 so as to enable pushing and pulling of the retractable cover during extension and retraction operations.

The receptacle 340 can also be provided with a delivery chute 346 which can be selectively opened or closed using a sliding cover 348. The sliding cover 348 can be provided within the receptacle or can be provided on a bottom portion of the food container or cartridge 344. The base 304 can then be provided with another actuator 378 with another cog or spoked wheel 379 so as to effectuate opening or closing the chute 346 during dispensing operations.

The base 304 can also serve as a housing so as to contain an electronic controller 400 which can control the various actuators based on received commands or signals thereto. The controller 400 can be configured to communicate wirelessly over Wi-Fi, Bluetooth, mobile network, or some other wireless communication network so as to receive remote commands, track pet eating information, profiles etc. on a remote server and storage database. The electronic controller can also be configured to receive information received from one or more sensors 350 or 354 provided about the base 304.

In some instances, the sensors 350 can include RFID, NFC, Bluetooth, optical, infrared, or virtually any other sensor as adapted to communicate pet information, metrics, environmental factors, etc. In particular, sensors 354 can include weight sensors so as to determine an amount of food dispensed, and ultimately the amount of food which has been consumed by a given animal in a particular feeding window or timeframe.

Also, as discussed briefly above, the system can be configured to provide an alert to the user regarding different status conditions of the feeder. Such conditions can include: 1) a low food alert; 2) the food contained is not the expected kind; 3) food was withdrawn after a timeout without being eaten; 4) food was withdrawn due to presence of unauthorized pet; 5) video shot by the feeder's optical sensor has been uploaded to the pet profile; 6) There is a physical problem with the dispenser.

It will be appreciated that the user can access the pet information and alerts via an online portal or via an application provided on a mobile device. In certain instances, the user can utilize a mobile application to set feeding schedules, feeding windows, portion sizes, etc. In some instances, the mobile device can be utilized to receive the alerts discussed above. In yet additional embodiments the system can generate recommendations based on analyzed data across multiple users regarding food types and portions based on numerous similar pet profiles. In yet additional embodiments the system can be utilized to schedule appropriate food orders in pre-charged cartridges for easy loading into the dispenser. In some additional embodiments, the user can set up a payment account and arrange for automatic delivery of food cartridges based on various sensed conditions or alerts.

In some additional embodiments the dispenser can be provided with one or more status indication means. Such means can include an LCD or touch panel which can be utilized to display messages and/or receive input from a user. Alternative means can include LED lights which can provide status indication regarding normal operation, low battery, food level, etc.

Figure 13:
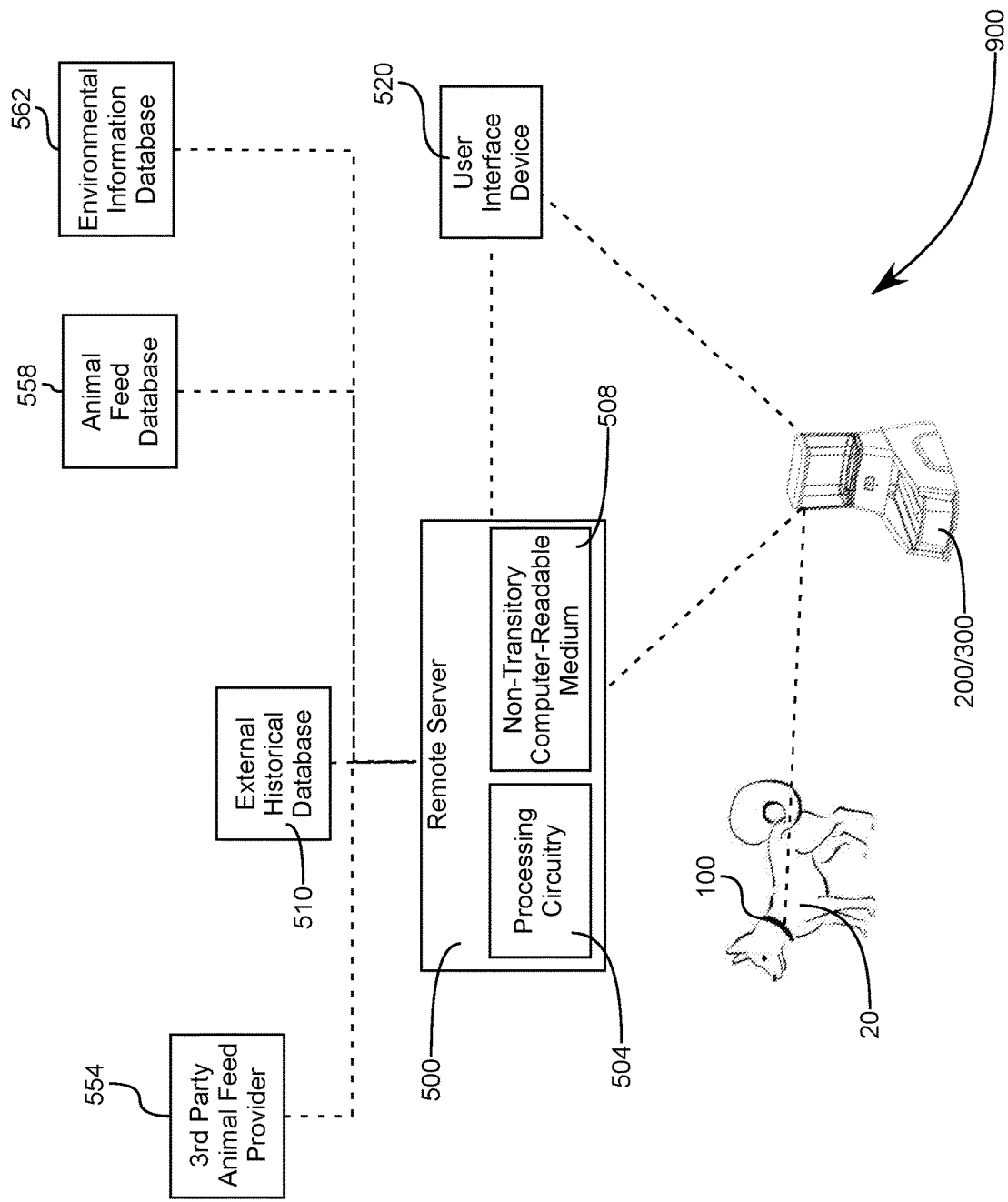
FIG. 13 illustrates an exemplary schematic of a system for connecting and controlling the food dispensers disclosed herein as well as implementing various methods of use thereof.

As illustrated in FIG. 13, the system 10 can be configured be wirelessly connected over a wireless network to a server 500 which can be connected to a historical database. A user can also be remotely connected to the feeder using a portal, which can be enabled on smart devices or other online portals on any number of user interface devices 520. In some embodiments the feeder will have a "manual dispense" option, where the user presses can press a button in an application provided on the user interface device 520. In this manner food can be dispensed in response to a direct or manual user input. The signal from the user interface device can then be transmitted over the wireless network and the controller 400 can cause the feeder to dispense the food.

In some embodiments, the controller 400 can also be pre-programmed such that the feeder will dispense food to one or more pets on a predetermined schedule. The predetermined schedule can be set by the user, or a personalized recommendation by the suggested based on a determination relating to pet breed, weight, age, etc. which can be determined from data stored on the historical database.

In some embodiments, and as shown in FIG. 14, the feeder 600 can be configured to include a main body 604 having sufficient depth so as to allow for retraction of the bowl 610 into a cavity 609 formed in the front surface 608. In some such embodiments, the bowl can be provided on a separate retractable platform, or coupled to other actuation means which can be configured to pull the bowl 610 into the cavity 609 when not in a feeding mode, after the feeding time window is expired, etc. In this manner the bowl 610 can be presented or retracted based on whether food is present, for dispensing operations, or for allowing pet access.

In some embodiments, the system can also be configured to generate food recommendations which are personalized and take into account the pet's breed, age, gender, and personality traits, as entered by the user into the pet's profile, which can also be stored on the historical database.

Additionally, if a system recognized or correlated collar is used in conjunction with the feeder and the pet profile, then the recommendations can also be configured so as to consider the pet's activity level, the climate of its environment, and other sensory data detected by the collar, or as detected by sensors provided about the feeder.

The recommendation algorithm can also make determinations and recommend a type of food to feed the pet, based on caloric needs, particular nutritional requirements based on the pet parameters, breed etc.

It will be appreciated that a user/owner can be provided with override control, in which the user would be able to accept the recommendation in whole or in part, or override some or all of the recommendation in favor of their own desired food type, schedule, and portion sizes.

In some embodiments the food cartridge can be re-usable and re-filled with a user's desired food type. However, in some instances, the cartridges can be single use and the food for each charge can be provided in the single-use cartridge, and then either recycled, returned to the manufacturer for refill, or be disposable.

In some embodiments the cartridges, and any food or charges contained therein can be configured to lock into the feeder. They can be released by operating a catch on the back. The catch should be pet resistant, and require some sort of articulated locking mechanism which would be easily operated by the user, but not easily operated by a particular pet. In some instances the release mechanism can be controlled by the controller, wherein the app can be utilized to release the catch.

In some instances, and as shown herein, the catch can be provided as a flush square of material with a finger hole in it which can be utilized to pull out so as to release the cartridge.

In some instances the cartridge can be provided as a clear plastic container with a removable top. In some such instances food can be poured into the cartridge without first removing it from the feeder.

In some embodiments the cartridge can be configured to receive a separate food container, such as a cardboard box with a plastic shuttle piece attached to the bottom. The food can then be shipped inside these boxes. The user takes a food box, locks it into the feeder, and particularly within the cartridge, and then the food is ready to dispense. When the food box is empty, the user removes the food box, recycles it, and replaces it with a new one.

In some instances, the box containing a new food charge can include an RFID tag attached thereto such that the feeder will know what type of food is installed in the cartridge based on identification information associated with the RFID tag. In such cases, this RFID tag can include a unique serial number, so the feeder can also distinguish between one box and another even if both boxes have the same type of food contained therein.

In some instances, after the feeder detects that a food box has been completely emptied, the system can be configured to disallow reuse of the food box to be reused. This prevents users from cutting open the box and refilling it with some other kind of food and thus skewing data recorded and stored on the historical database with improper information correlated to the original food contained therein.

The feeder can also be configured to alert the user if the type of food installed in it is not the kind that was assigned to the pet's profile from within the app.

In some embodiments the cartridge and the food boxes can be configured to form an airtight seal from the environment so as to keep the food fresh.

In some embodiments, when a scheduled mealtime begins, the feeder can be configured to emit a sound from a speaker or other emitter so as to indicate the beginning of a mealtime to a pet. The sound can be customized, so that each pet in the household is signaled with a different sound.

If the pet is wearing an associated or paired collar, the sound can be played through the collar's speaker, in case the pet is out of earshot of the feeder.

When the pet whose feeding time it is, i.e. the authorized pet, approaches the feeder during a mealtime, the feeder detects the presence of the pet in the vicinity through RFI, Bluetooth, or some other wireless communication, the feeder can then dispense the appropriate amount of food for the authorized pet's meal.

In some embodiments the feeder can be configured to dispense the meal portion gradually, to prevent the pet from eating the meal too quickly as some pets eat too quickly, which increases risk of a fatal condition where the pet's stomach flips, or causes vomiting.

In some embodiments, the controller can be configured to take the food away from the pet, by closing a cover over the dish, as illustrated and discussed above, 20-30 minutes after the meal has been dispensed. Some vets recommend that uneaten portions of meals be taken away, rather than allowing the pet to graze over time.

In some embodiments, the controller, by means of sensors on the feeder, and on various pet collars, can detect the presence of any other pet or animals, i.e. unauthorized pets, approaching the feeder during the authorized pet's mealtime. In response to such a detection the controller will cause the food to be become unavailable, i.e. the cover will close over the dish, such that the unauthorized pet(s) cannot eat the authorized pet's meal. When the unauthorized pet(s) leave the vicinity of the feeder again, access to the food will be restored for the authorized pet.

If the unauthorized pet is wearing an associated and enabled collar recognizable by the system, then the user may optionally set it up so that the pet receives a correction from the collar, ultrasound and/or audible sound and/or vibration signal, or shock, when the pet approaches the feeder during a different pet's mealtime.

In some embodiments the user will be able to manually open or close the food cover through the app provided on the user interface device through the user portal.

In some embodiments the food dish can be removable, such that the user can remove the dish for cleaning. In some embodiments, the dish can be locked in place but can be released by disengaging a locking structure.

In some embodiments, the feeder can be provided with load sensors in both the food reservoir, i.e. the cartridge, as well as in or below the dish so that it can detect how much food is left in both of these locations. In some embodiments the system can generate and deliver an alert to the user's smart device when the feeder is low on food. Additionally, the system can generate and deliver an alert to the user's smart device when pet leaves part or all of a dispensed meal in the bowl. The feeder can also be configured to measure how much food is consumed by a pet and report it to the server wherein the consumption history can be stored on the historical database.

In some embodiments the system can be utilized, either in the application or through the user access portal, such that the user can review historical data about how much the pet has eaten each day over time, view trends, etc.

The amount of consumed food can be referenced with a particular type of food wherein a number of calories consumed can be determined.

In some embodiments the server can be linked to ordering means, whereby the user may enroll in a food replenishment program wherein the system can be configured to automatically place orders for new food when the amount of food is becoming depleted so as to ensure delivery before depletion based on consumption trends.

The system can also track types of food consumed in the historical database and correlate the type of food consumed to external factors, such as environmental data, time of year, wherein, for example, a user may choose a specific type of food based on the season, cycle food etc. In such embodiments the system can be configured to recognize consumption trends and adjust the new food orders accordingly to appropriately meet projected needs.

In some embodiments, the user may pause or deactivate the automatic ordering program, override trend recognition, input schedules, etc., at any time, by utilizing the user access portal which can include an order management portal associated with each pet profile, or user profile. A user can also manually trigger orders, cancel existing orders, and review past orders.

An LED light which can be provided about the front of the feeder can be configured to show different colors and blinking patterns to indicate the device's status. These statuses can include, but are not necessarily limited to, (1) Bluetooth pairing mode, (2) Firmware update mode, (3) Ready, (4) Network failure, (5) Internal malfunction, (6) Foreign object stuck in the bowl, (7) Low food alert, (8) Low battery alert. Alternatively, the feeder can also be provided with a local user access portal with a touch screen display or LCD display which the user can utilize to review detailed information regarding status of the feeder.

For power, the feeder can be configured to plug into the wall through an AC cord with a wall connector. In some alternative embodiments the feeder can be provided with a battery backup component, which can be configured to charge when there is wall power available and use the battery power to operate the feeder when there is not, such as during power outages.

It will be further appreciated that the dispenser should be formed of a material which can withstand attempts at unauthorized access to the food contained therein by pets. The dispenser can also include weights provided in a bottom portion so as to resist tipping if bumped by a pet. In some instances, the dispenser can be provided with a non-slip surface about the bottom so as to prevent it from sliding on a surface, such as a counter or floor.

Figure 15:
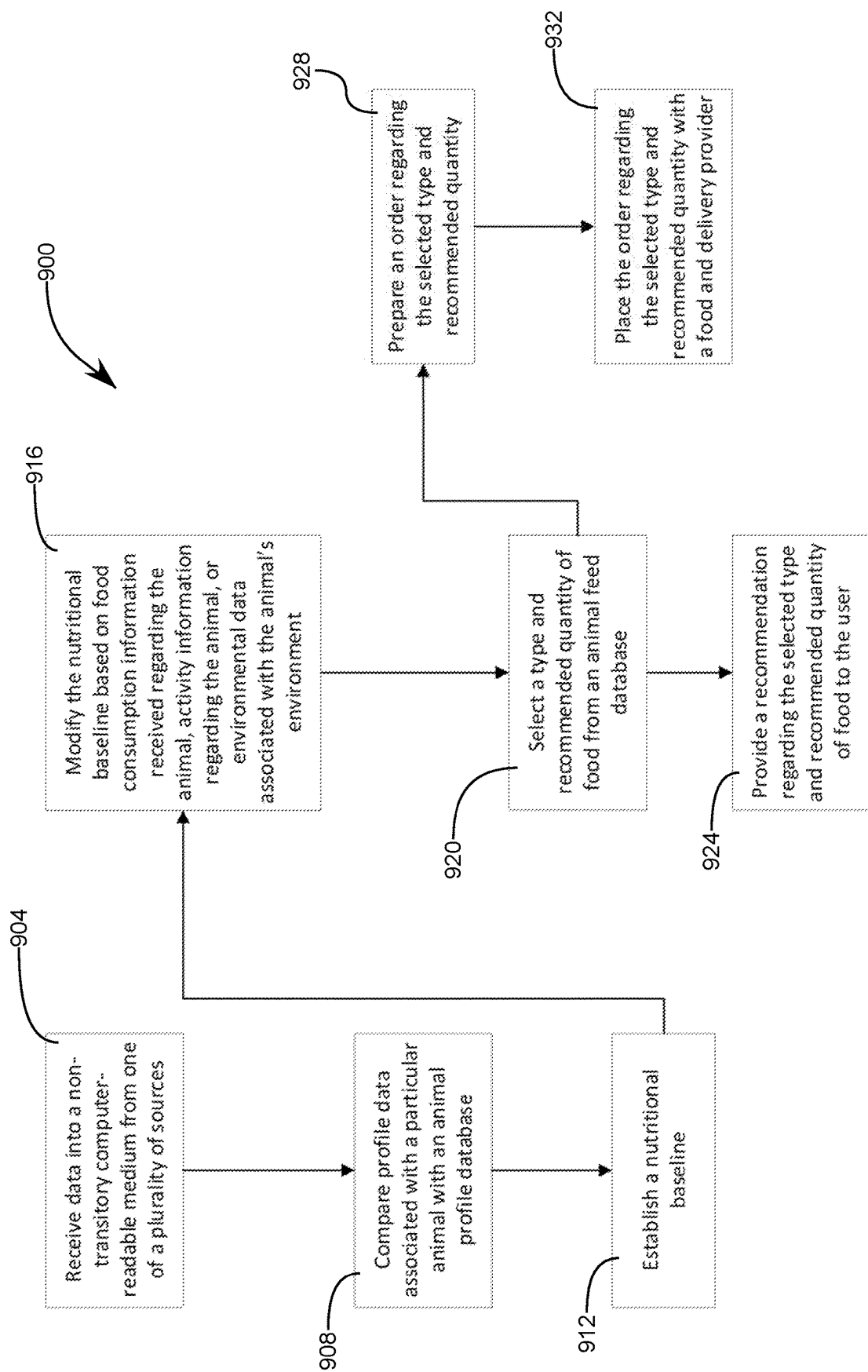
FIG. 15 illustrates an exemplary flow chart discussing various steps of a method of use of a system for connecting and controlling the food dispensers disclosed herein.

In some embodiments, and as shown in FIGS. 13 and 15, various aspects of the present invention can be implemented utilizing an animal food recommendation system 900 which can include a computational framework and connection interface which interacts with various components as discussed herein, such as the feeder 200/300 a pet 20 and a collar 100 provided about the pet. Such a system can include a server 500, either local or remote, which can include a non-transitory computer-readable medium 508 containing one or more sets of computer instructions; and processing circuitry 504. In some such embodiments, the system can be configured to receive input data from the following sources: food consumption information associated with an animal, which can be tracked by the feeder 200/300; activity information associated with the animal, which can be tracked by the collar; profile data associated with the animal, which can be input by a user on a user interface device 520 and stored on an external historical database; environmental data associated with the animal, which can be sensed by the collar 100, by the feeder 200/300, or accessed over a network, such as from a geological survey, weather, or other environmental information database 562. The system can also be utilized to compare tracked animal data and input profile information to an animal profile database which can contain profile, activity, environmental info, or any other pet parameter, wherein the animal profile database can also be stored on the external historical database 510. Further, the system can access and analyze parameters relating to various potential food types which can be stored on an animal feed database 558; In this manner the system can then cause the processing circuitry to compare profile data associated with the animal to the animal profile database to determine an initial baseline for a given animal, and then compare food consumption information, activity information with the animal feed database to determine a type and quantity of food to be fed to the animal.

In some embodiments, the animal profile database can include historical data regarding the particular pet wherein the current feeding portions and activity levels can be compared to current feeding portions and activity levels. For example, previous historical entries can be utilized to project imminent portion size needs based on activity levels or environmental factors which occurred previously, such as the previous year in a similar season, etc. Further, a particular pet's historical data can be utilized to recognize trends in behavior, such as that the pet is more active during certain times of the day, during particular temperature ranges, during particular seasons, etc., wherein the historical data can again be used to make food recommendations or project ordering needs.

In some embodiments, and as discussed above, an automatic food dispensing system, i.e. the feeder 200/300, can be configured to monitor food consumption information associated with the animal and transmit said food consumption information to the processing circuitry, such as by weighing the food upon dispensing, and comparing the weight of the food after the animal has finished eating. In this manner the system can track calories consumed and ensure the number of calories provided matches with the number of calories being burned. As such, the system can also include an activity tracking collar as discussed above which can be configured to monitor activity information associated with the animal and transmit said activity information to the processing circuitry. In some such embodiments the collar can further monitor environmental data associated with the animal and transmit said environmental data to the processing circuitry.

In some embodiments the profile data associated with a particular pet can be manually entered by a user attending to the animal's well-being, such as an owner, or a veterinarian.

The processing circuitry, by comparing pet profile info to the existing profile information relating to the pet parameters can, as discussed above, generate a recommendation regarding food the pet should be provided, which recommendation can be transmitted to, and received by, a third-party animal feed and delivery provider 554 which provider 554 can then automatically fill the order and deliver the recommended food for use in the feeder or dispenser.

A method for recommending food to an animal system 900 which can be implemented by the systems discussed above is also contemplated herein, wherein the method can include the steps of: receiving data into a non-transitory computer-readable medium from one of a plurality of sources 904. These sources can include: food consumption information associated with an animal as stored in the pet's profile information; activity information associated with the animal which can also be recorded and stored in the pet's profile information; other profile data associated with the animal; environmental data associated with the animal; an animal profile database; and an animal feed database.

The method can also include the steps of: utilizing a set of processing circuitry to perform the following tasks: comparing profile data associated with the animal with an animal profile database 908; determining an initial nutritional baseline for the animal 912; modifying the nutritional baseline based on food consumption information associated with the animal, activity information associated with the animal, or environmental data associated with the animal 916; and selecting from an animal feed database a type and recommended quantity of food to be fed to the animal based on the modified nutritional baseline 920.

The method can also include the steps of: preparing an order regarding the selected type and recommended quantity 928; and placing the order with a food and delivery provider 932 in such a manner the particular type and quantity of recommended food can be made available for insertion into the automatic food dispensing system or feeder for dispensing to the pet upon subsequent feedings.

Alternatively, and as discussed above, method can include a step of: providing a recommendation regarding the selected type and recommended quantity of food to the user 924, wherein the user may choose to personally oversee purchase and procurement of said particular food for insertion into the feeder or dispensing system. Or in some instances, the user can input an override food selection, wherein the system can access or otherwise be provided with nutritional information regarding the override food selection and the system can then be utilized to provide a recommended portion size based on the various pet parameters given the override food selection's particular nutritional information as it applies to the particular pet.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A pet monitoring and feeding system comprising:
    a dispenser, the dispenser further comprising:
        a main body;
        a bowl provided about a base portion of the main body;
        a base portion configured to selectively receive the bowl;
        one or more dispenser sensors being configured to provide proximity data regarding environmental or pet parameters; and
        a receptacle portion configured to retain a food within the main body, the receptacle portion being in selective communication with the bowl;
    processing circuitry, the processing circuitry being configured to receive sensor data from the dispenser sensors pertaining to a particular pet, the processing circuitry being configured to determine an appropriate portion size of a particular food being contained in the receptacle portion and activate a dispensing action so as to dispense a selectively measured portion of the particular food associated with the particular pet into the bowl; and
    an activity sensor provided about the particular pet, the activity sensor being configured to track activity level during an intermediate time period between food dispensing functions,
    wherein the processing circuitry adjusts the portion size of the particular food based on information received from the activity sensor regarding an activity level of the particular pet.

2. The system of claim 1, wherein the one or more dispenser sensors are configured to detect a wireless transponder provided about the particular pet, wherein at least one feeder sensor is configured to detect the wireless transponder and determine a pet identity.

3. The system of claim 1, further comprising a collar having an audio transmitter provided about the collar, the processing circuitry being configured to initiate a positive sound from the audio transmitter indicative of a feeding time.

4. The system of claim 3, wherein the processing circuitry is configured to initiate a positive sound therefrom indicative of a completion of food consumption.

5. The system of claim 1, wherein the one or more dispenser sensors are configured to determine the presence of one of a plurality of pets, wherein the processing circuitry adjusts the portion size of the particular food based on the detection of an associated pet.

6. The system of claim 1, further comprising a shield provided about the dispenser, the shield being configured to allow selective access to the bowl.

7. The system of claim 6, wherein the shield includes a retractable door having a plurality of rollable hinged sections.

8. The system of claim 6, wherein the one or more dispenser sensors are configured to determine the presence of one of a plurality of pets, wherein the processing circuitry is configured to render the bowl inaccessible when an unauthorized pet is determined to be present.

9. A pet monitoring and feeding system comprising:
    a dispenser, the dispenser further comprising:
        a main body;
        a bowl provided about a base portion of the main body;
        a base portion configured to selectively receive the bowl;
        one or more dispenser sensors being configured to provide proximity data regarding environmental or pet parameters; and
        a receptacle portion configured to retain a food within the main body, the receptacle portion being in selective communication with the bowl;
        a wireless transponder provided about a particular pet, wherein at least one feeder sensor is configured to detect the wireless transponder and determine a pet identity;
    processing circuitry, the processing circuitry being configured to receive sensor data from the one or more dispenser sensors, the processing circuitry being configured to determine an appropriate portion size of a particular food being contained in the receptacle portion and activate a dispensing action so as to dispense a selectively measured portion of the particular food into the bowl; and
    a shield provided about the dispenser, the shield includes a retractable door that includes a plurality of rollable hinged sections, and wherein the shield is configured to allow selective access to the bowl.

10. The system of claim 9, wherein the one or more dispenser sensors are configured to determine the presence of one of a plurality of particular pets, wherein the processing circuitry adjusts the portion size of the particular food based on information received from the one or more dispenser sensors.

11. A pet monitoring and feeding system comprising:
    a dispenser, the dispenser further comprising:
        a main body;
        a bowl provided about a base portion of the main body;
        a base portion configured to selectively receive the bowl;
        one or more dispenser sensors being configured to provide proximity data regarding environmental or pet parameters;
        a receptacle portion configured to retain a food within the main body, the receptacle portion being in selective communication with the bowl;
        wherein the one or more dispenser sensors are configured to determine the presence of one of a plurality of pets, wherein the processing circuitry adjusts the portion size of the particular food based on information received from the dispenser sensor; and
        a shield provided about the dispenser, the shield includes a retractable door having a plurality of rollable hinged sections, and wherein the shield is configured to allow selective access to the bowl;
    processing circuitry, the processing circuitry being configured to receive sensor data from the one or more dispenser sensors, the processing circuitry being configured to determine an appropriate portion size of a particular food being contained in the receptacle portion and activate a dispensing action so as to dispense a selectively measured portion of the particular food into the bowl.

12. The system of claim 11, wherein at least one of the one or more dispenser sensors is configured to determine the presence of one of a plurality of pets, wherein the processing circuitry is configured to render the bowl inaccessible when an unauthorized pet is determined to be present.

* * * * *